(12) United States Patent
Krah et al.

(10) Patent No.: US 8,988,384 B2
(45) Date of Patent: Mar. 24, 2015

(54) FORCE SENSOR INTERFACE FOR TOUCH CONTROLLER

(75) Inventors: Christoph Horst Krah, Los Altos, CA (US); Eugene Lvovich Shoykhet, Cupertino, CA (US); Martin Paul Grunthaner, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 626 days.

(21) Appl. No.: 13/243,925

(22) Filed: Sep. 23, 2011

(65) Prior Publication Data

US 2013/0076646 A1 Mar. 28, 2013

(51) Int. Cl.
| G06F 3/041 | (2006.01) |
| G06F 3/045 | (2006.01) |
| G06F 3/047 | (2006.01) |
| G06F 3/044 | (2006.01) |

(52) U.S. Cl.
CPC .............. *G06F 3/0414* (2013.01); *G06F 3/045* (2013.01); *G06F 3/047* (2013.01); *G06F 3/0416* (2013.01); *G06F 3/044* (2013.01)
USPC ...... 345/174; 345/173; 178/18.05; 178/18.06

(58) Field of Classification Search
CPC ......... G06F 3/044; G06F 3/045; G06F 3/047; G06F 3/0414
USPC ......... 345/156–184; 178/18.04, 18.06, 18.03, 178/18.05
See application file for complete search history.

(56) References Cited

U.S. PATENT DOCUMENTS

| 4,071,691 A * | 1/1978 | Pepper, Jr. ................. 178/18.05 |
| 5,483,261 A | 1/1996 | Yasutake |
| 5,488,204 A | 1/1996 | Mead et al. |
| 5,801,682 A * | 9/1998 | Coni et al. ................. 345/174 |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,492,979 B1 * | 12/2002 | Kent et al. ................. 345/173 |

(Continued)

FOREIGN PATENT DOCUMENTS

| JP | 2000-163031 A | 6/2000 |
| JP | 2002-342033 A | 11/2002 |
| WO | 2006133018 | 12/2006 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Dimitriy Bolotin
(74) *Attorney, Agent, or Firm* — Kendall P. Woodruff

(57) ABSTRACT

A force sensor interface in a touch controller of a touch sensitive device is disclosed. The force sensor interface can couple to touch circuitry to integrate one or more force sensors with touch sensors of the device. The force sensor interface can include one portion to transmit stimulation signals generated by the touch circuitry to the force sensors to drive the sensors. The interface can also include another portion to receive force signals, indicative of a force applied to the device, from the force sensors for processing by the touch circuitry. The device can use the touch circuitry to concurrently and seamlessly operate both the force sensors and the touch sensors.

24 Claims, 15 Drawing Sheets

(56) References Cited

U.S. PATENT DOCUMENTS

| | | |
|---|---|---|
| 6,690,387 B2 | 2/2004 | Zimmerman et al. |
| 7,015,894 B2 | 3/2006 | Morohoshi |
| 7,085,657 B2 | 8/2006 | Drossel |
| 7,184,064 B2 | 2/2007 | Zimmerman et al. |
| 7,356,769 B2 | 4/2008 | Lehtonen |
| 7,663,607 B2 | 2/2010 | Hotelling et al. |
| 7,982,721 B2 * | 7/2011 | Hio ................. 345/173 |
| 8,305,358 B2 * | 11/2012 | Klinghult et al. ......... 345/174 |
| 8,421,483 B2 * | 4/2013 | Klinghult et al. ......... 324/686 |
| 8,514,189 B2 * | 8/2013 | Wu et al. .............. 345/173 |
| 8,633,916 B2 * | 1/2014 | Bernstein et al. ......... 345/174 |
| 8,659,559 B2 * | 2/2014 | Wu et al. .............. 345/173 |
| 2006/0022959 A1 * | 2/2006 | Geaghan ............ 345/173 |
| 2006/0026521 A1 | 2/2006 | Hotelling et al. |
| 2006/0138983 A1 * | 6/2006 | Lee et al. ............ 318/254 |
| 2006/0197753 A1 | 9/2006 | Hotelling |
| 2006/0279548 A1 * | 12/2006 | Geaghan ............. 345/173 |
| 2006/0284856 A1 * | 12/2006 | Soss ................ 345/173 |
| 2008/0018621 A1 | 1/2008 | Vincent et al. |
| 2008/0136790 A1 * | 6/2008 | Hio ................. 345/173 |
| 2009/0009483 A1 * | 1/2009 | Hotelling et al. ......... 345/173 |
| 2009/0065267 A1 * | 3/2009 | Sato ................ 178/18.06 |
| 2010/0060590 A1 * | 3/2010 | Wilson et al. ........... 345/173 |
| 2010/0123686 A1 | 5/2010 | Klinghult et al. |
| 2011/0025634 A1 * | 2/2011 | Krah et al. ............ 345/173 |
| 2011/0037713 A1 * | 2/2011 | Chen et al. ............ 345/173 |
| 2011/0115732 A1 * | 5/2011 | Coni et al. ........... 345/173 |
| 2011/0141052 A1 * | 6/2011 | Bernstein et al. ......... 345/174 |
| 2011/0167391 A1 | 7/2011 | Momeyer et al. |
| 2011/0187674 A1 | 8/2011 | Baker et al. |
| 2011/0234508 A1 * | 9/2011 | Oda et al. ............ 345/173 |
| 2012/0007832 A1 * | 1/2012 | Lee et al. ............ 345/174 |
| 2012/0062498 A1 * | 3/2012 | Weaver et al. .......... 345/174 |
| 2012/0062499 A1 * | 3/2012 | Weaver et al. .......... 345/174 |
| 2012/0086668 A1 * | 4/2012 | Wang et al. ........... 345/174 |
| 2013/0018489 A1 * | 1/2013 | Grunthaner et al. ........ 700/73 |
| 2013/0033450 A1 * | 2/2013 | Coulson et al. .......... 345/174 |
| 2013/0069905 A1 * | 3/2013 | Krah et al. ............ 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

FORCE SENSOR INTERFACE FOR TOUCH CONTROLLER

FIELD

This relates generally to input sensing and more particularly to integrating force sensing with touch sensing.

BACKGROUND

Many types of input devices are presently available for performing operations in a computing system, such as buttons or keys, mice, trackballs, joysticks, touch sensor panels, touch screens and the like. Touch sensitive devices, such as touch screens, in particular, are becoming increasingly popular because of their ease and versatility of operation as well as their declining price. A touch sensitive device can include a touch sensor panel, which can be a clear panel with a touch-sensitive surface, and, in some cases, a display device such as a liquid crystal display (LCD) that can be positioned partially or fully behind the panel so that the touch-sensitive surface can cover at least a portion of the viewable area of the display device. The touch sensitive device can allow a user to perform various functions by touching the touch sensor panel using a finger, stylus or other object at a desired location and, in the case of the display device, at a location often dictated by a user interface (UI) being displayed by the display device. In general, the touch sensitive device can recognize a touch or hover event and the position of the event at the touch sensor panel, and the computing system can then interpret the event and thereafter can perform one or more actions based on the event.

In addition to a touch sensor panel, some touch sensitive devices can include a button, which when contacted by a user can cause the device to change a state associated with the button. Pressing or selecting the button can activate or deactivate some state of the device. Not pressing or selecting the button can leave the device in its current state. In general, the touch sensitive device can recognize a press or force event at the button, and the computing system can then interpret the event and thereafter can perform one or more actions based on the event.

The use of multiple input mechanisms, such as a touch sensor panel and a button, can provide additional functionality for the user. On the other hand, each mechanism requires circuitry space and operating power, which can undesirably increase device size and decrease battery life.

SUMMARY

This relates to a force sensor interface in a touch sensitive device that can be coupled with the device's touch circuitry so as to integrate one or more force sensors with touch sensors of the device. The force sensor interface can include a transmit portion to transmit stimulation signals generated by the touch circuitry to the force sensors to drive the force sensors. The interface can also include a receive portion to receive force signals, indicative of a force applied to the device, from the force sensors for processing by the touch circuitry. This can allow the force sensors and the touch sensors to concurrently operate in an efficient and seamless manner. By the force sensors and the touch sensors sharing touch circuitry, the touch sensitive device can advantageously have multiple input mechanisms, i.e., touch sensors to detect touch or hover events and force sensors to detect force events, without undesirably increasing device size and power consumption.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to a force sensor interface in a touch sensitive device that can be coupled with the device's touch circuitry so as to integrate one or more force sensors with touch sensors of the device. The force sensor interface can include a transmit portion to transmit stimulation signals generated by the touch circuitry to the force sensors to drive the force sensors. The interface can also include a receive portion to receive force signals, indicative of a force applied to the device, from the force sensors for processing by the touch circuitry. By using touch stimulation signals to drive the force sensors, the modulating nature of the stimulation signals can advantageously reduce noise in the resultant force signals. Additionally, by sharing touch circuitry between the force sensors and the touch sensors, device power consumption and circuitry space can be advantageously reduced over devices having separate circuitry.

Figure 1:
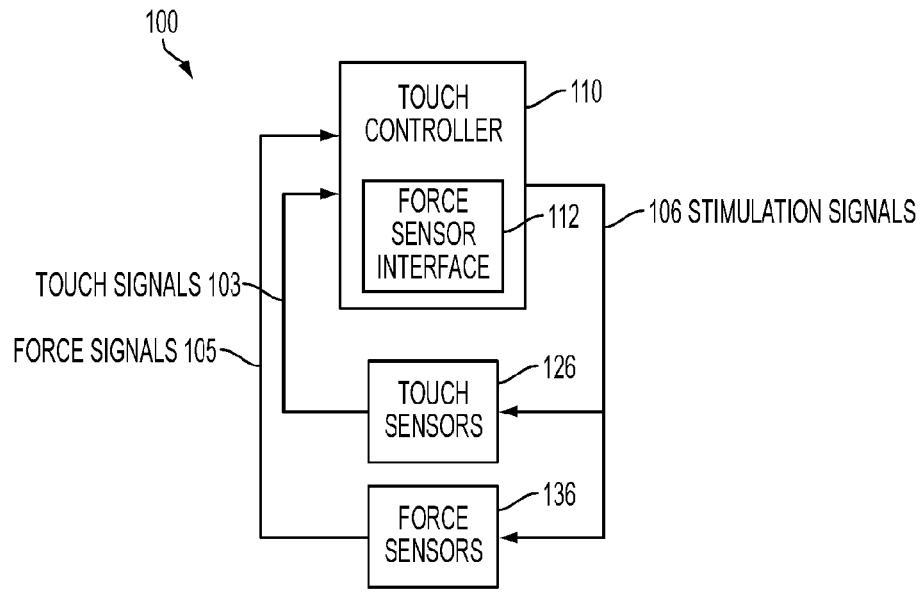
FIG. 1 illustrates an exemplary touch sensing circuit according to various embodiments.

FIG. 1 illustrates an exemplary touch sensing circuit according to various embodiments. In the example of FIG. 1, touch sensing circuit 100 can include touch controller 110 having force sensor interface 112. The circuit 100 can also include one or more touch sensors 126 and one or more force sensors 136. The touch controller 110 can be coupled to the touch sensors 126 and can generate and transmit stimulation signals 106 to the touch sensors so as to drive the touch sensors to sense an object touching or hovering over the touch sensors. In some embodiments, the touch controller 110 can transmit multiple simultaneous stimulation signals 106 to the touch sensors to simultaneously drive the touch sensors 126 in a multi-stimulus configuration. In alternate embodiments, the touch controller 110 can transmit one stimulation signal 106 at a time to drive the touch sensors 126 in a single stimulus configuration. The touch controller 110 can also receive and process touch signals 103 from the touch sensors 126 indicative of the touching or hovering object. The touch controller 110 can similarly be coupled to the force sensors 136 via the force sensor interface 112 and can generate and transmit the stimulation signals 106 to the force sensors so as to drive the force sensors to sense a force applied by an object at the force sensors. The touch controller 110 can also receive and process force signals 105 via the interface 112 from the force sensors 136 indicative of the applied force. The interface 112 can be integrated into the touch controller 110 to use existing touch sensing circuitry with the force sensors 136 for seamless operation of all the sensors, which will be described in detail below.

Figure 2A:
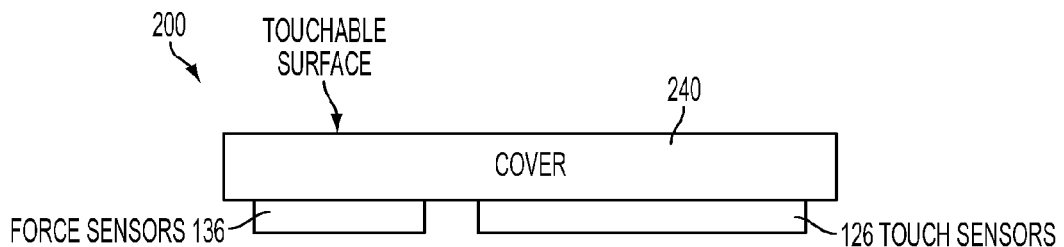
FIGS. 2A and 2B illustrate cross-sectional views of exemplary touch sensitive devices according to various embodiments.
Figure 2B:
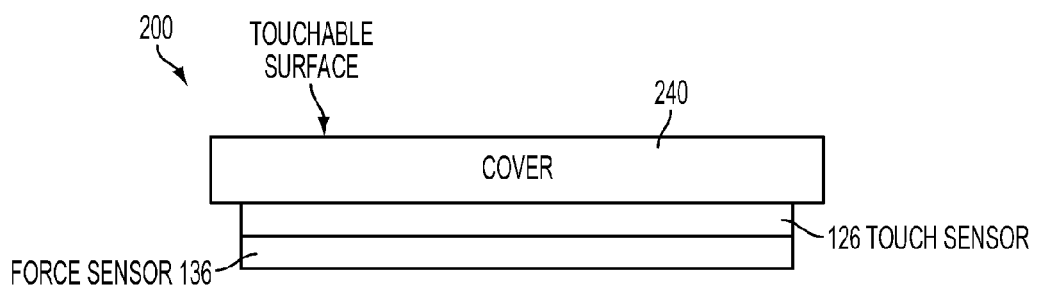

FIGS. 2A and 2B illustrate exemplary touch sensitive devices that can include the sensing circuit of FIG. 1. In the example of FIG. 2A, touch sensitive device 200 can include cover 240 having a touchable surface that an object can hover over, touch, or press on. The device 200 can also include force sensors 136 disposed on a surface of the cover 240 opposite the touchable surface, although in other embodiments the sensors can be supported on another substrate adjacent to the cover. The force sensors 136 can sense the force applied by an object pressing on the touchable surface. The device 200 can further include touch sensors 126 disposed on the surface of the cover 240 opposite the touchable surface, or on another substrate adjacent to the cover. The touch sensors 126 can be adjacent to the force sensors 136. In other embodiments, the touch sensors 126 can encircle the force sensors 136. The cover 240 can be glass, plastic, or any suitable material capable of providing a substantially rigid substrate having a touchable surface. In the example of FIG. 2B, the touch sensors 126 can be disposed on a surface of the cover 240 opposite the touchable surface, although in other embodiments the sensors can be supported on another substrate adjacent to the cover. The force sensors 136 can be disposed on the touch sensors 126.

Figure 3A:
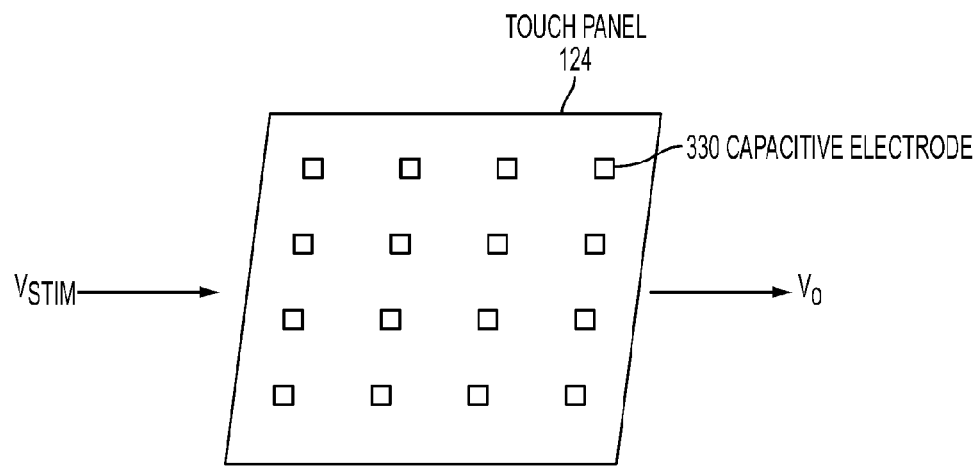
FIGS. 3A and 3B illustrate exemplary touch panels that can be used in a touch sensing circuit according to various embodiments.
Figure 3B:
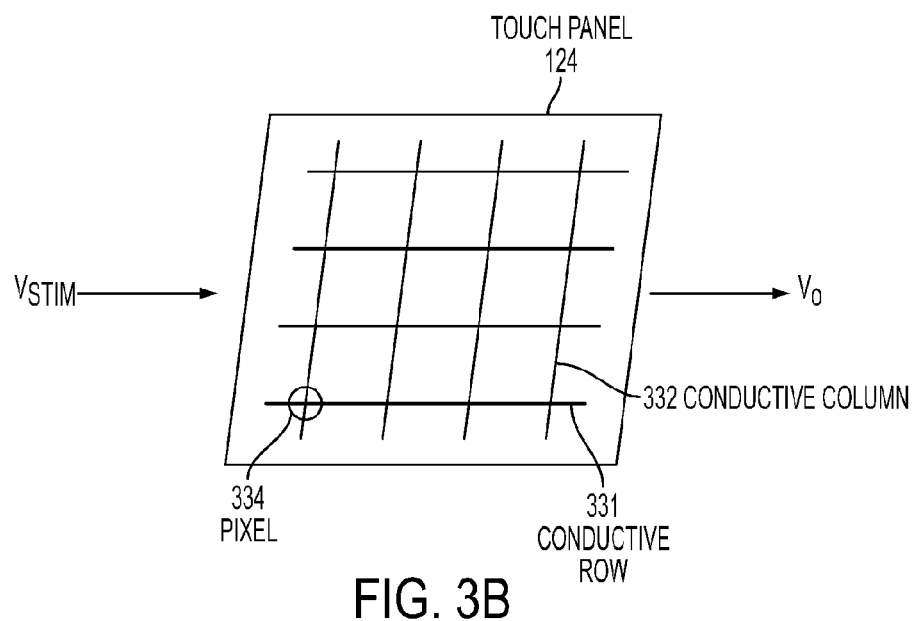

FIGS. 3A and 3B illustrate exemplary touch panels that can be used in the sensing circuit of FIG. 1 to sense a touching or hovering object. FIG. 3A illustrates a plan view of a touch panel, which in this case can be self capacitive. In the example of FIG. 3A, touch panel 124 can have self capacitive electrodes 330. The self capacitance of the electrodes 330 can be measured relative to some reference, e.g., ground. The electrodes 330 can be spatially separated elements, where each electrode can define a touch sensor (or pixel) of the panel 124. The electrodes 330 can be coupled to a touch controller driving circuit (not shown) to drive the electrodes with stimulation signals (voltage Vstim, where Vstim can be a positive (+) phase signal Vstim+ or a negative (−) phase signal Vstim−) to sense an object touching at or hovering over the panel 124 and to a touch controller sensing circuit (not shown) to process touch signals (voltage Vo) indicative of the touching or hovering object.

When the object is proximate to the touch panel 124, an electrode 330 can capacitively couple to the object, e.g., a finger, causing a capacitance to be formed between the electrode and the object. This can increase the self capacitance at the electrode. As the object gets closer to the panel 124, the capacitance to ground can continue to increase and the electrode self capacitance can correspondingly increase. Thus, when the touch controller sensing circuit detects an increase in self capacitance of the electrode 330, the increase can be interpreted as a touching or hovering object.

FIG. 3B illustrates a plan view of an alternate touch panel, which in this case can be mutually capacitive. In the example of FIG. 3B, touch panel 124 can have conductive rows 331 and columns 332 forming spatially separated drive and sense lines, respectively. Here, the conductive rows 331 and columns 332 can cross each other to form pixels 334 at the cross locations, where each pixel can define a touch sensor. Other configurations of the drive and sense lines are also possible, such as side by side. The conductive rows 331 can be coupled to a touch controller driving circuit (not shown) to drive the rows and the conductive columns 332 to a touch controller sensing circuit (not shown) to process signals indicative of the object touch or hover.

When the object is proximate to the touch panel 124, the stimulated row associated with a pixel 334 can capacitively couple to the object, e.g., a finger, causing charge to be shunted from the stimulated row to ground through the object. This can reduce the mutual capacitance from the row to the column at the pixel 334. As the object gets closer to the panel 124, the amount of shunted charge can continue to increase and the mutual capacitance at the pixel 334 can correspondingly decrease. Thus, when the touch controller sensing circuit detects a drop in mutual capacitance at the pixel 334, the drop can be interpreted as a touching or hovering object.

In an alternate embodiment, the conductive rows 331 and columns 332 in the mutual capacitive touch panel 124 of FIG. 3B can be replaced with conductive nodes to form the pixels 334, where each node includes a pair of electrodes separated by a dielectric, one electrode being the drive electrode and the other electrode being the sense electrode. The conductive nodes can operate in a similar manner as the drive and sense lines to detect a drop in mutual capacitance indicative of a touching or hovering object.

Figure 4A:
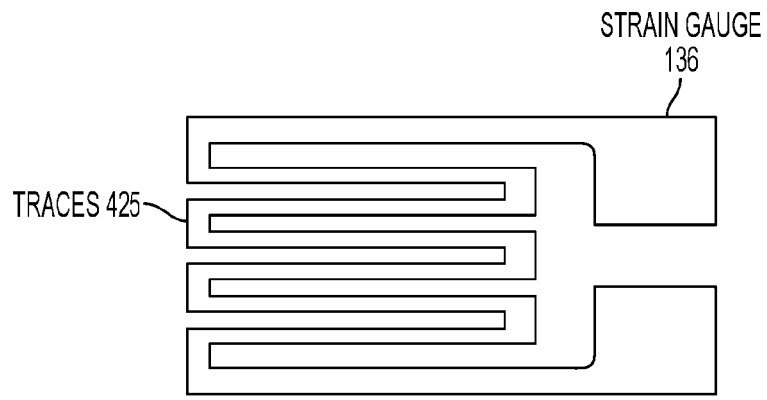
FIGS. 4A and 4B illustrate an exemplary force sensor that can be used in a touch sensing circuit according to various embodiments.

FIG. 4A illustrates a plan view of an exemplary force sensor that can be used in the sensing circuit of FIG. 1 to sense force applied by an object. In this case, the force sensor can be a strain gauge. In the example of FIG. 4A, strain gauge 136 can include traces 425 positioned closely together, but not touching, while at rest, i.e., while not strained or otherwise deformed. The strain gauge can have a nominal resistance in the absence of strain or force, such as 1.8KΩ+/−0.1%, and can change as a function of applied strain & as follows.

$$\Delta R = R_{SG} \cdot GF \cdot \varepsilon, \quad (1)$$

where ΔR=change in strain gauge resistance, $R_{SG}$=resistance of undeformed strain gauge, and GF=gauge factor.

Figure 4B:
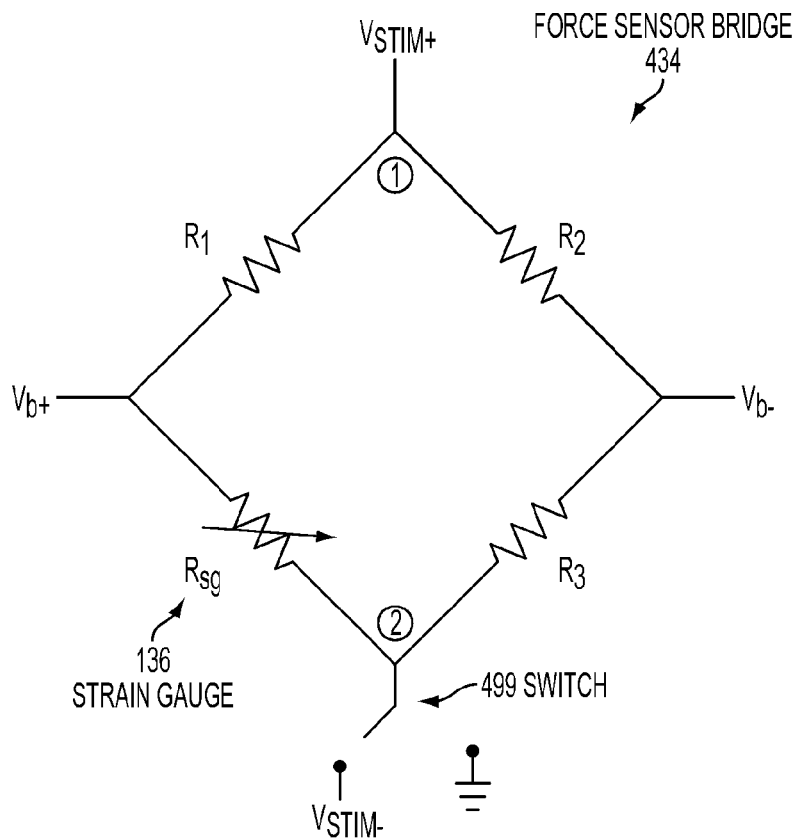

As shown in the example of FIG. 4B, the gauge 136 (illustrated as Rsg) can be included in wheatstone bridge 434 with three other resistors (illustrated as R1, R2, R3) to sense resistance changes in the gauge (relative to the other resistors) indicative of the applied force. The bridge 434 can be coupled to a force sensor interface (not shown) to receive stimulation signals (voltage Vstim+ and Vstim−) from the touch controller (not shown) to drive the gauge 136 and to transmit force signals (voltage Vb+ and Vb−) indicative of the applied force to the touch controller for processing. Vstim+ and Vstim− can be defined as follows.

$$V_{STIM+}(t) = V_{STM0} \cdot \sin(\omega \cdot t) + V_{CM}, \quad (2)$$

$$V_{STIM-}(t) = -V_{STM0} \cdot \sin(\omega_{STM} t) + V_{CM}, \quad (3)$$

where Vstm0=amplitude of the force stimulation signal (mid-2-peak), $\omega_{STM}$=frequency of force stimulation signal in radians, and Vcm=common mode voltage. The force signals Vb+ and Vb− therefore can be as follows.

$$V_{b+} = \frac{R_{SG}}{R_1 + R_{SG}} \cdot V_{STM0} \cdot \sin(\omega_{STM} \cdot t) + V_{CM}, \quad (4)$$

$$V_{b-} = \frac{R_3}{R_2 + R_3} \cdot V_{STM0} \cdot \sin(\omega_{STM} \cdot t) + V_{CM}. \quad (5)$$

With the substitution R1=R2=R3=R, Rsg=R+ΔR, where ΔR=R·GF·ε. The force signal Vb as a function of strain & can therefore be as follows.

$$V_b = (V_{b+} - V_{b-}) = \left(\frac{1}{2} - \frac{1}{(GF \cdot \varepsilon + 2)}\right) \cdot V_{STM0} \cdot \sin(\omega_{STM} \cdot t). \quad (6)$$

The bridge 434 can include input ports (illustrated as (1) and (2) in FIG. 4B), where one input port (1) can be coupled to a stimulation signal Vstim+ and the other input port (2) can be connected to switch 499 to switch between coupling to a stimulation signal Vstim− and coupling to ground. Although the bridge of FIG. 4B includes only one strain gauge, it is to be understood that up to four strain gauges can be used at the positions illustrated by R1, R2, R3, Rsg, where the resistance changes of the gauges can be used to sense the applied force.

When force is applied to a substrate to which the gauge 136 is attached (such as the cover of FIGS. 2A, 2B), the substrate can bow, causing the gauge traces 425 to stretch and become longer and narrower, thereby increasing the gauge resistance. As the force being applied increases, the gauge resistance can correspondingly increase. Thus, when the touch controller sensing circuit detects a rise in resistance of the gauge 136, the rise can be interpreted as a force being applied to the gauge.

In an alternate embodiment, the bridge 434 can be integrated with the touch controller 110, where one or more of the resistors R1, R2, R3 can be replaced with resistors in the touch controller. For example, resistors R2, R3 can be replaced with resistors in the touch controller, such that the strain gauge 136 (illustrated as Rsg) and resistor R1 can form the bridge 434 with touch controller resistors. This can reduce the space occupied by the bridge 434.

A temperature change can adversely affect the gauge 136 because a temperature increase can cause the substrate to expand, without applied force, and consequently the gauge attached to the substrate to stretch. As a result, the gauge resistance can increase and be mistakenly interpreted as a force being applied to the gauge. To compensate for the temperature change, one or more of the resistors (R1, R2, R3) in the bridge 434 can be replaced with a thermistor. The thermistor's temperature-induced resistance change can counteract the temperature-induced resistance change of the strain gauge due to thermal expansion in the substrate to which the strain gauge is attached, thereby, reducing temperature-induced changes in the force signal Vb.

In an alternate embodiment, a separate wheatstone bridge can be used to detect temperature changes while the gauge bridge 434 detects applied force, where the separate bridge can include the thermistor and three other resistors. Alternatively, the bridge can include multiple thermistors. For example, two thermistors can be used, where one thermistor can be in the position of Rsg and the other can be in the position of R2 in FIG. 4B. For this configuration, the force signal Vb can be maximum as Vb+ and Vb− change in opposite directions relative to a quiescent operating point, e.g., at ambient temperature.

Figure 4C:
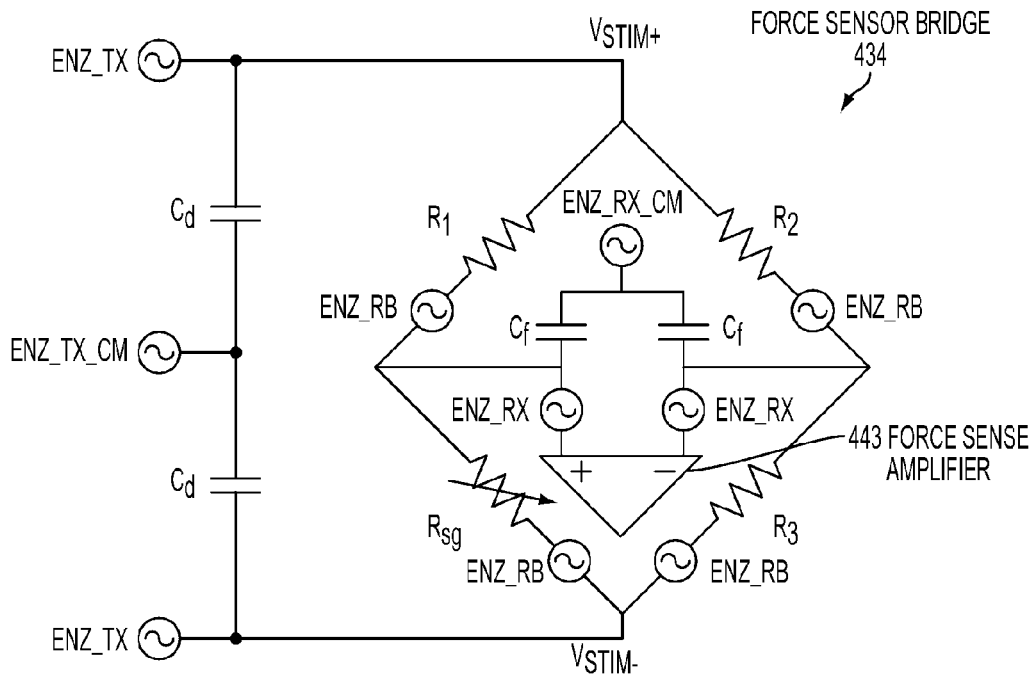
FIG. 4C illustrates an exemplary noise model for a force sensor that can be used in a touch sensing circuit according to various embodiments.

Noise introduced by the bridge 434 can adversely affect the force sensor signals and the touch sensor signals. FIG. 4C illustrates an exemplary noise model for the bridge 434 indicating various noise sources (illustrated by voltage noise densities "ENZ") that can undesirably introduce noise. In the example of FIG. 4C, voltage noise density ENZ_TX can be a single-ended noise component introduced by the stimulation signals Vstim that drive the bridge 434. Voltage noise density ENZ_RX can be an input referred noise density introduced by force sense amplifier(s) 443 of the force sensor interface. Voltage noise density ENZ_RB can be a noise density introduced by the bridge resistors (R1, R2, R3, Rsg). Device induced common mode voltage noise density ENZ_TX_CM can be capacitively coupled (illustrated by Cd) to drive lines that transmit the stimulation signals Vstim to the bridge 434. Similarly, device induced common mode voltage noise density ENZ_RX_CM can be capacitively coupled (illustrated by C0 with force sense lines that transmit the force signals Vb from the bridge 434.

Advantageously, the differential configuration of the drive lines and the force sense lines at the bridge 434 can be relied upon to reduce the common mode voltage noise densities ENZ_TX_CM and ENZ_RX_CM. Additionally, in some instances, the contribution of ENZ_TX can be negligible as it translates to a noise component proportional to and below the force signals Vb, provided that the stimulation signal signal-to-noise ratio (SNR) is reasonably high. However, the remaining voltage noise densities ENZ_RX and ENZ_RB can limit the minimum force signal that can be resolved. Because this remaining noise can be a function of frequency, more specifically, can be dominant at lower frequencies (due to 1/f noise), by adjusting the frequency of the stimulation signals Vstim that drive the bridge 434, this 1/f noise can be reduced, thereby allowing smaller force signals to be resolved and the force signal SNR to be boosted.

Figure 4D:
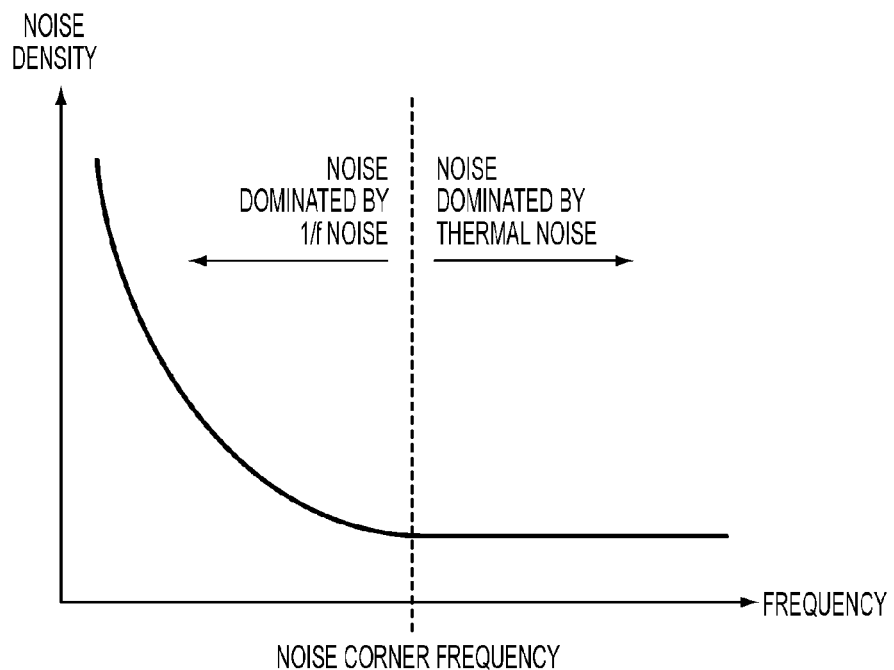
FIG. 4D is a graph showing noise as a function of frequency in an exemplary force sensor that can be used in a touch sensing circuit according to various embodiments.

FIG. 4D is a graph showing noise density as a function of frequency for the bridge of FIG. 4C. Below a noise corner frequency, 1/f noise can be the dominant noise. Above the noise corner frequency, thermal noise can dominate. The frequency of the stimulation signals Vstim can be adjusted to be at or above the noise corner frequency so as to substantially reduce or eliminate the 1/f noise and boost the force signal SNR. Because the noise corner frequency is dependent on circuit performance, the noise corner frequency for the bridge 434 can be selected based on the performance of the bridge and associated circuitry.

Above the noise corner frequency, the input voltage noise density ENZ_IN at the bridge 434 can be approximately $$E_{NZ\_IN} = \sqrt{4 \cdot K \cdot T \cdot R + 2 \cdot E_{NZ\_AMP}^2}, \qquad (7)$$

where K=Boltzman constant, T=temperature in Kelvin, R=bridge resistance (Rsg=R1=R2=R3), and ENZ_AMP=input referred noise of force sense amplifier. The first term in Equation (7) is the voltage noise density ENZ_RB of each bridge resistor. In order to resolve the minimum force signal, the following condition may be met.

$$V_{B\_RMS}(\text{Min}) > E_{NZ\_IN} \cdot f_{BW}, \qquad (8)$$

where Vb_rms=RMS signal amplitude from force sensor bridge at minimum strain &, and $f_{BW}$=touch/force sensor integration bandwidth.

Figure 5:
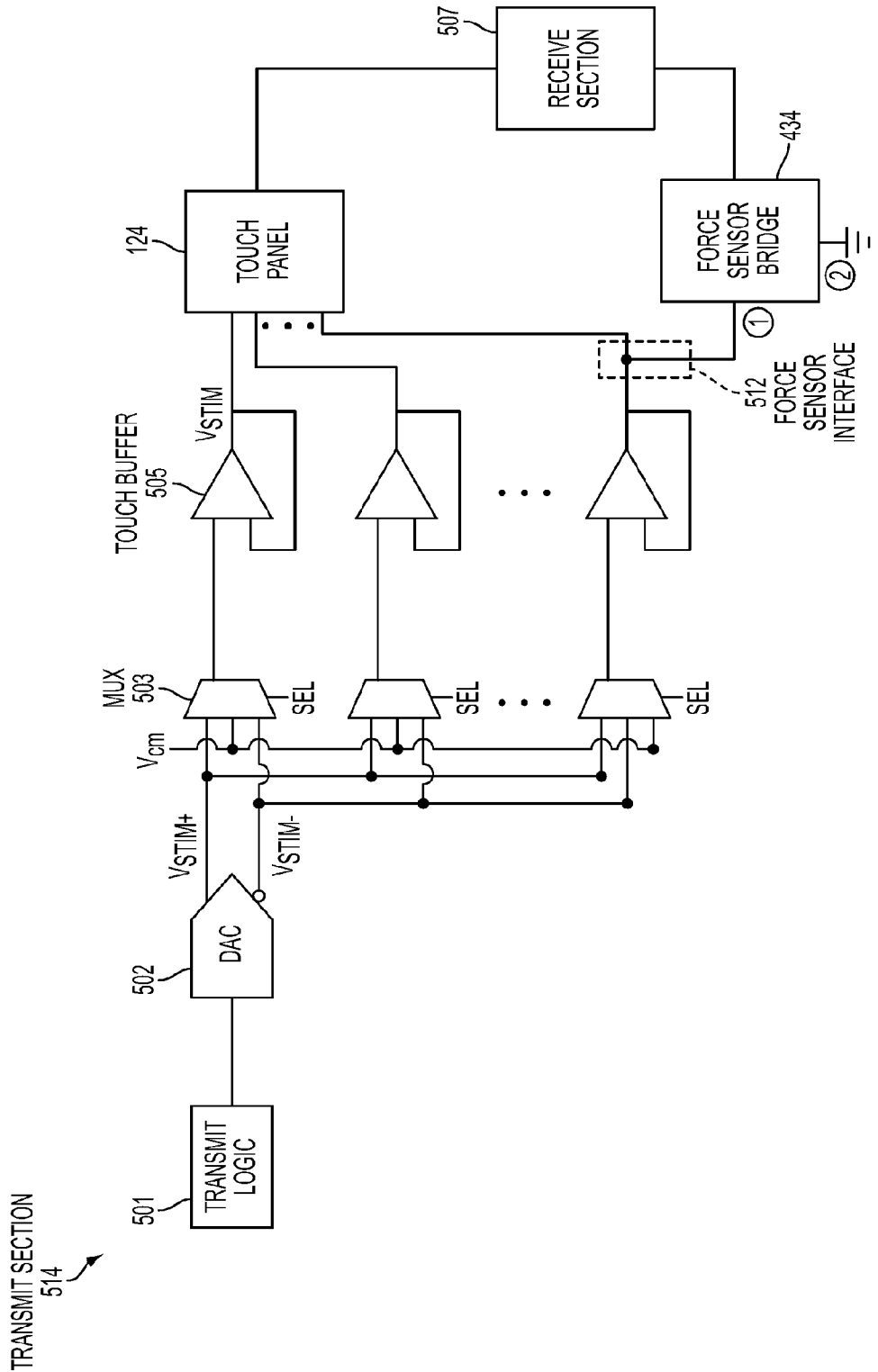
FIG. 5 illustrates an exemplary transmit section of a touch controller having a force sensor interface according to various embodiments.

FIG. 5 illustrates an exemplary transmit section of a touch controller having a force sensor interface according to various embodiments. In the example of FIG. 5, transmit section 514 of a touch controller can generate and transmit stimulation signals to touch panel 124 and force sensor bridge 434 to drive them to sense touch and force respectively. The transmit section 514 can include transmit logic 501, digital-to-analog convertor (DAC) 502, and one or more drive channels that each includes an analog multiplexer 503 and corresponding touch buffer 505. The transmit logic 501 can connect to a transmit numerically-controlled oscillator (NCO) (not shown) for phase and frequency digital data signals. The DAC 502 can convert the digital signals from the transmit logic 501 into analog stimulation signals Vstim to supply the multiplexers 503. Vstim can be a positive (+) phase signal Vstim+ having a waveform at the same frequency as the transmit NCO. Vstim can also be a negative (−) phase signal Vstim− having the same waveform as Vstim+ inverted about a common voltage Vcm. The common voltage Vcm can also supply the multiplexers 503. The multiplexers 503 can select Vstim+, Vstim−, or Vcm signals to supply the corresponding touch buffers 505 according to the control signals SEL. The touch buffers 505 can gain up the stimulation signals from the transmit DAC 501 and provide the drive capability to drive the touch panel 124 and the force sensor bridge 434.

Force sensor interface 512 can be integrated with the transmit section 514 so that force sensor bridge 434 can be easily coupled via the interface to the touch sensitive device, thereby adding force sensing capability to the device. The force sensor interface 512 can couple one or more of the touch buffers 505 to the force sensor bridge 434. In this example of FIG. 5, the force sensor interface 512 can include a connection from the output of the touch buffer 505 to an input port (illustrated by (1)) of the bridge 434 to supply the stimulation signal Vstim (either Vstim+ or Vstim−) from the buffer to the bridge. The other input port (illustrated by (2)) of the bridge 434 can couple to ground. This configuration can provide a single-ended stimulus input to the bridge 434. Concurrently, the buffer 505 can supply the stimulation signal Vstim to the touch panel 124.

In response to the stimulation signals, the touch panel 124 and the force sensor bridge 434 can generate touch and force signals respectively, as described previously. The touch and force signals can be transmitted to receive section 507 of a touch controller for further processing, as will be described in detail below.

Figure 6:
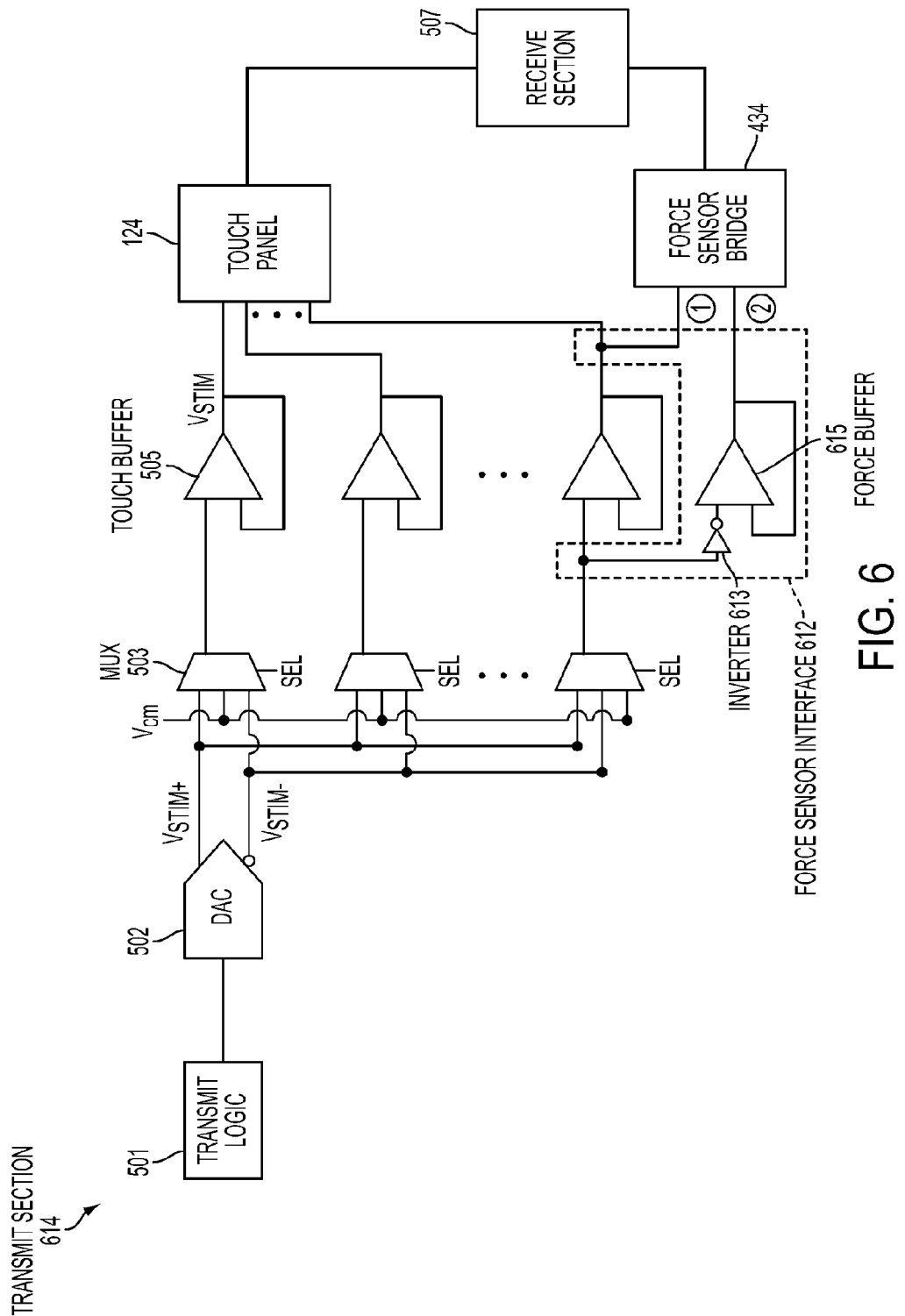
FIG. 6 illustrates another exemplary transmit section of a touch controller having a force sensor interface according to various embodiments.

FIG. 6 illustrates another exemplary transmit section of a touch controller having a force sensor interface according to various embodiments. The transmit section of FIG. 6 is the same as the transmit section of FIG. 5 except for the force sensor interface. In the example of FIG. 6, force sensor interface 612 can include a connection from the output of the touch buffer 505 to an input port (illustrated by (1)) of the bridge 434 to supply the stimulation signal Vstim (either Vstim+ or Vstim−) from the buffer to the bridge. The force sensor interface 612 can also include inverter 613 and force buffer 615 branching off the input to the touch buffer 505 to supply the stimulation signal Vstim to the inverter. The inverter 613 can invert the stimulation signal Vstim and feed the inverted stimulation signal to the force buffer 615. The force buffer 615 can supply the inverted stimulation signal to the other input port (illustrated by (2)) of the bridge 434. This configuration can provide a differential stimulus signal to the bridge 434, where one port provides the stimulation signal Vstim and the other port provides the inverted stimulation signal. Concurrently, the touch buffer 505 can supply the stimulation signal Vstim to the touch panel 124.

Figure 7:
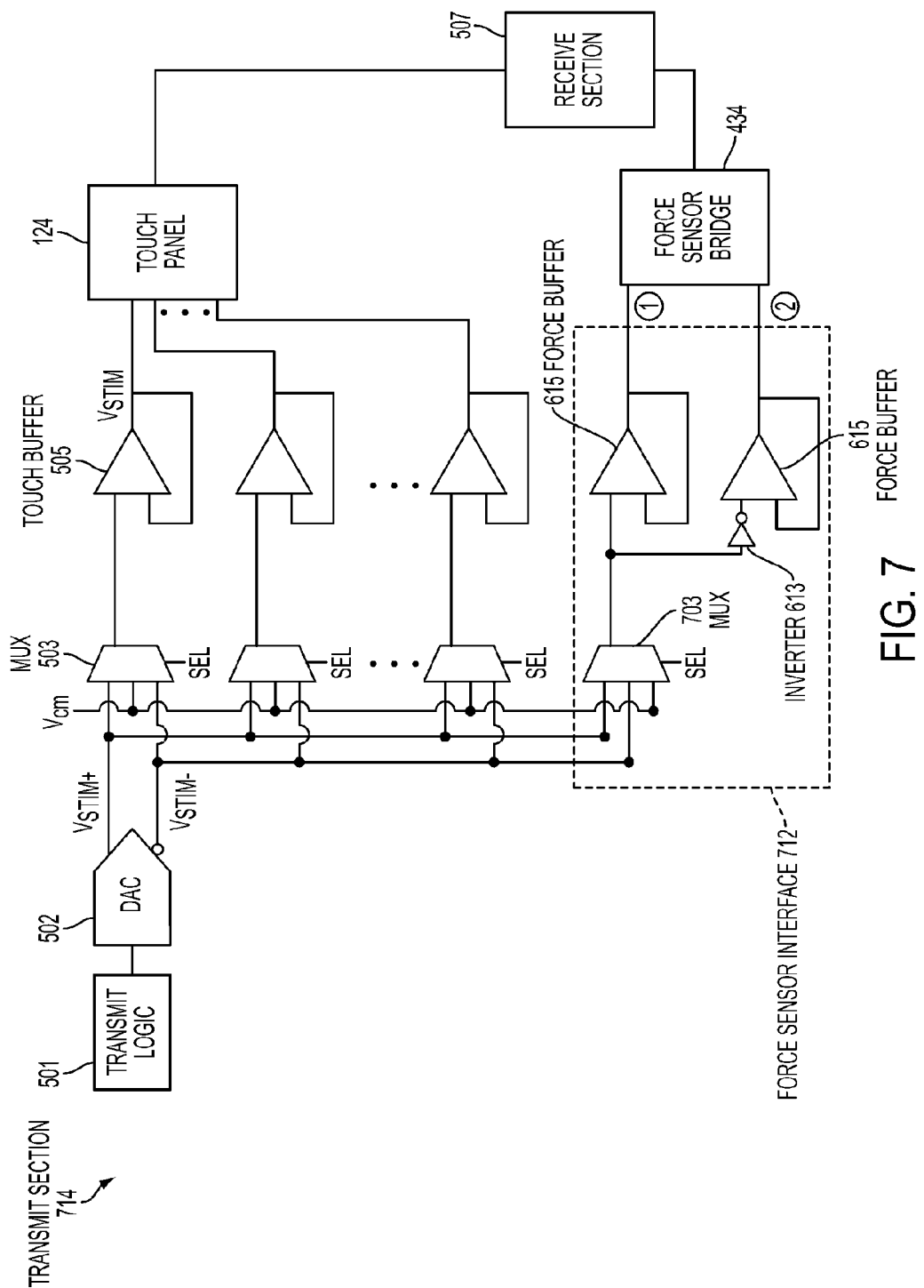
FIG. 7 illustrates still another exemplary transmit section of a touch controller having a force sensor interface according to various embodiments.

FIG. 7 illustrates still another exemplary transmit section of a touch controller having a force sensor interface according to various embodiments. The transmit section of FIG. 7 is the same as the transmit section of FIG. 5 except for the force sensor interface. In the example of FIG. 7, force sensor interface 712 can couple force buffers 615 (rather than the touch buffers 505) to the force sensor bridge 434. The force sensor interface 712 can include multiplexer 703 to select Vstim+, Vstim−, or Vcm signals to supply the corresponding force buffers 615 according to the control signal SEL. A first of the force buffers 615 can supply the stimulation signal Vstim to an input port (illustrated by (1)) of the bridge 434. A second of the force buffers 615 and inverter 613 can branch off the input to the first force buffer to supply the stimulation signal Vstim to the inverter. The inverter 613 can invert the stimulation signal Vstim and feed the inverted stimulation signal to the second force buffer 615. The second force buffer 615 can supply the inverted stimulation signal to the other input port (illustrated by (2)) of the bridge 434. This configuration can provide a differential stimulus signal to the bridge 434, where one port provides the stimulation signal Vstim and the other port provides the inverted stimulation signal. Concurrently, one or more of the touch buffers 505 can supply the stimulation signal Vstim to the touch panel 124. In this example, the touch buffers 505 can be separate and uncoupled from the force sensor interface 712.

Figure 8:
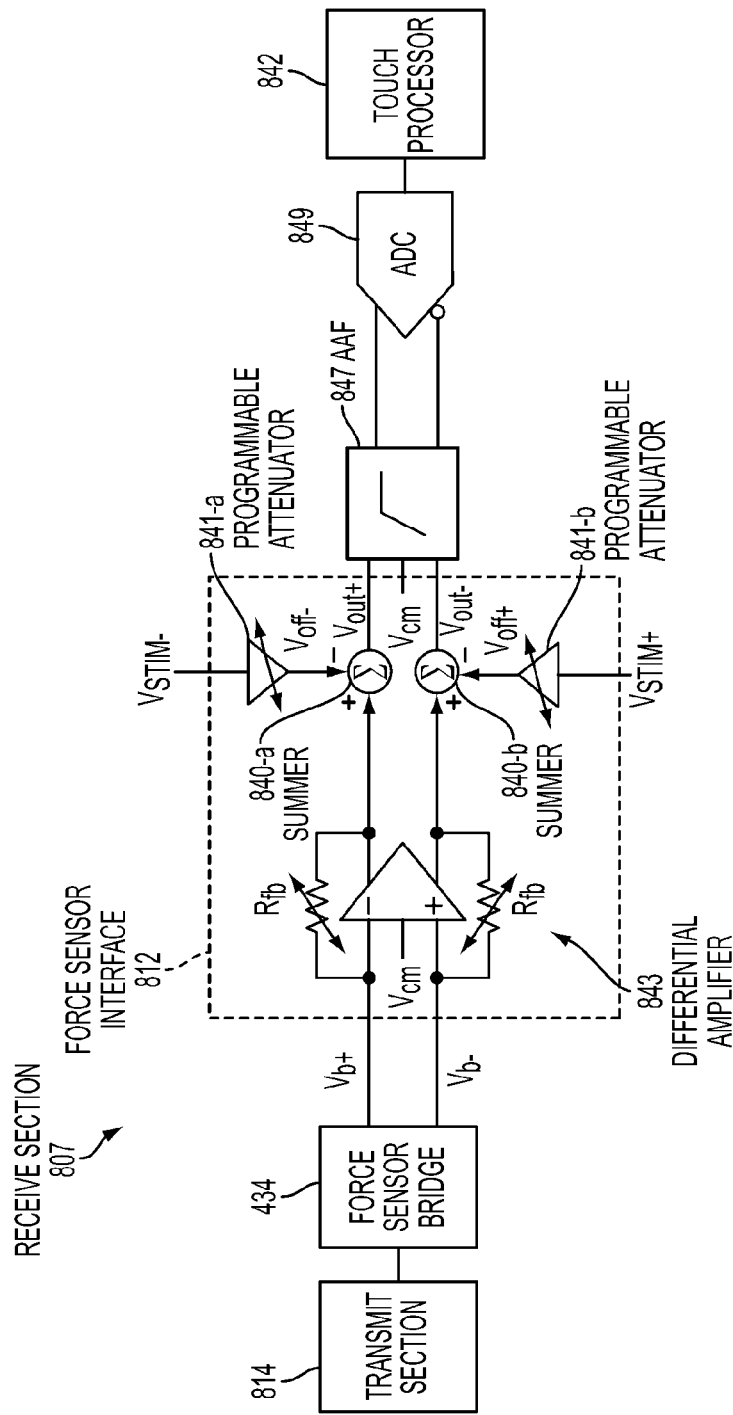
FIG. 8 illustrates an exemplary receive section of a touch controller having a force sensor interface according to various embodiments.

FIG. 8 illustrates an exemplary receive section of a touch controller having a force sensor interface according to various embodiments. In the example of FIG. 8, receive section 807 of a touch controller can receive and process force signals from force sensor bridge 434. The receive section 807 can include force sensor interface 812 for receiving and preparing the force signals for processing. The force sensor interface 812 can include differential amplifier 843, which can connect to the bridge 434 to receive force signals Vb, indicative of the applied force, from the bridge. Vb can be a positive (+) phase signal Vb+ and a negative (−) phase signal Vb−. The amplifier 843 can have common mode noise rejection to reduce common mode noise that can be present on the force signals Vb. In addition to common mode noise rejection, the amplifier 843 can gain up the dynamic force signals Vb to improve the dynamic range of the receive section 807. The amplifier 843 can have either a static or a programmable gain according to the needs of the touch controller.

The equivalent single ended output signal Vo from the differential amplifier 843 as a function of strain ∈ and time t can be as follows.

$$V_o(\varepsilon, t) = (V_{o+} - V_{o-}) = \frac{R_F}{R} \cdot \left( \frac{1}{(1 + GF \cdot \varepsilon)} - 1 \right) \cdot V_{STM0} \cdot \sin(\omega_{STM} \cdot t), \quad (9)$$

where Rf=feedback resistor of differential amplifier, R=bridge resistors (R=Rsg=R1=R2=R3), GF=gauge factor, $V_{STM0}$=force sensor stimulus, and $\omega_{STM}$=stimulus frequency in radians. The overall gain of the amplifier 843 can be a function of the dynamic range of differential analog-to-digital converter (ADC) 849 and the integration bandwidth. The following condition may be met.

$$G_{AMP} \cdot SNDR_{ADC} > 20 \cdot \log\left(\frac{V_{IN\_ADC}}{V_B}\right), \quad (10)$$

where $G_{AMP}$=gain of amplifier in decibels (dB), $SNDR_{ADC}$=signal-to-noise and distortion ratio of ADC within the force/touch integration bandwidth in decibels (dB), $V_{IN\_ADC}$=dynamic RMS input range of ADC, and $V_B$=RMS force sensor bridge signal. Similarly, the condition of Equation (10) may be met for the receive sections in FIGS. 9 through 11, described below.

In some instances, the force sensor(s) and other resistors in the bridge 434 can be mismatched, thereby creating an error signal that can be propagated and amplified at the amplifier 843 and/or differential anti-aliasing filter (AAF) 847 so as to saturate the differential ADC 849. To compensate for the mismatch, the force sensor interface 812 can include summers 840 and programmable attenuators 841 to perform offset subtraction. The attenuator 841-*a* can receive and attenuate the stimulation signal Vstim− so as to provide a fraction Voff− of the stimulation signal to the summer 840-*a*. The summer 840-*a* can then subtract Voff− from the output signal of the amplifier 843. Similarly, the attenuator 841-*b* can receive and attenuate the stimulation signal Vstim+ so as to provide a fraction Voff+ of the stimulation signal to the summer 840-*b*. The summer 840-*b* can then subtract Voff+ from the output signal of the amplifier 843. Because offset subtraction is performed on the output signals from the amplifier 843, i.e., the force signals Vb after they have been gained up by the amplifier 843, the offset subtraction can be performed at higher granularity and the offset mismatch compensated for.

The receive section 807 can also include the differential AAF 847, differential ADC 849, and touch processor 842. The AAF 847 can receive the offset-compensated force signals Vout+, Vout− outputted from the summers 840 and can further reject noise in the force signals so as to prevent noise from aliasing back into the operating frequency range of the touch controller and to improve SNR of the force signals. In some embodiments, the AAF 847 can be a bandpass filter to reject noise outside of a particular band, e.g., noise far from the fundamental frequency of the force signals. In some embodiments, the AAF 847 can be a lowpass filter to reject high frequency noise. In some embodiments, the AAF 847 can include multiple filters for rejecting noise based on the needs of the device. The AAF 847 can have either a static or a programmable gain according to the needs of the touch controller. The ADC 849 can receive the noise-reduced force signals from the AAF 847 and can digitize the signals. Touch processor 842 can receive the digitized force signals from the ADC 849 for further processing.

In an alternate embodiment, the ADC 849 can be a sigma-delta converter with inherent anti-aliasing filtering, such that the AAF 847 can be omitted.

The receive section 807 can be coupled to transmit section 814, which can be the transmit sections of FIGS. 5 through 7, for example, to drive the bridge 434.

Figure 9:
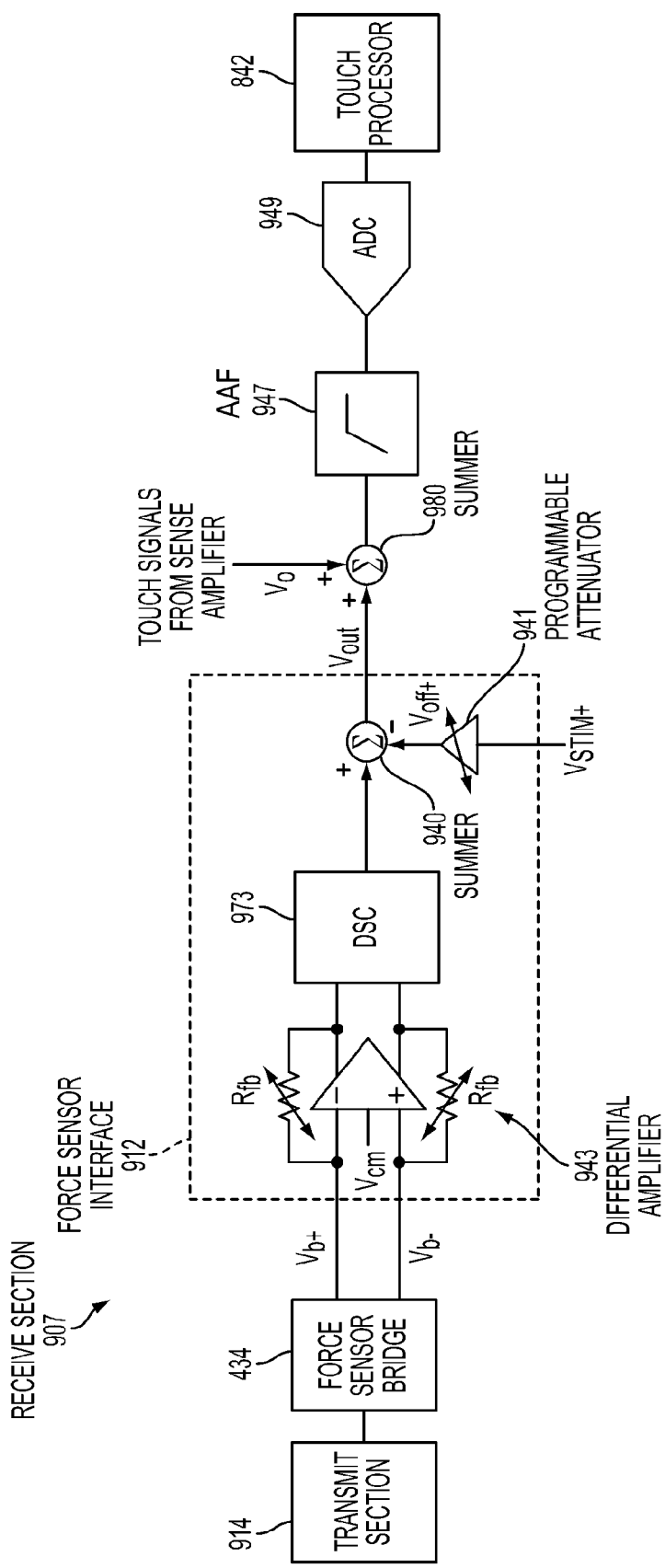
FIG. 9 illustrates another exemplary receive section of a touch controller having a force sensor interface according to various embodiments.

FIG. 9 illustrates another exemplary receive section of a touch controller having a force sensor interface according to various embodiments. In the example of FIG. 9, receive section 907 of a touch controller can share touch circuitry for processing touch and force signals together. The receive section 907 can include force sensor interface 912 for receiving and preparing the force signals for processing. The force sensor interface 912 can include differential amplifier 943, which can perform in a similar manner as the differential amplifier 843 of FIG. 8. The interface 912 can also include differential-to-single-ended converter (DSC) 973 coupled to the differential amplifier 943 to receive the force signals from the amplifier. The DSC 973 can convert the differential force sensor signals into a single ended signal. Equation (9) can apply here, where Vo in the Equation refers to the output of DSC 973. To compensate for mismatch between the force sensor(s) and the other resistors in the bridge 434, the interface 912 can also include summer 940 and programmable attenuator 941 to perform offset subtraction. The attenuator 941 can receive and attenuate the stimulation signal Vstim+ so as to provide a fraction Voff+ of the stimulation signal to summer 940. The summer 940 can then subtract Voff+ from the output signal of the DSC 973, thereby compensating for any mismatch in the force sensor bridge 434.

The receive section 907 can also include summer 980, AAF 947, ADC 949, and the touch processor 842. The summer 980 can combine the touch signals Vo and the offset-compensated force signals Vout. The touch signals Vo from the touch sensors can be conditioned by a sense amplifier (not shown), which will be described in more detail in FIG. 12. The composite touch and force signals can be passed to the AAF 947 to reject noise and other undesirable components and to the ADC 949 to digitize the signals. The touch processor 842 can receive the digitized composite touch and force signals for further processing. Because the touch and force signals can share the AAF 947 and ADC 949, less circuits can be used, thereby saving circuit real estate and power.

In an alternate embodiment, the summer 980 can be omitted and the force signals can be processed by the AAF 947 and ADC 949, while the touch signals are processed concurrently by a different AAF and ADC.

The receive section 907 can be coupled to transmit section 914, which can be the transmit section of FIG. 7, for example, to drive the bridge 434. Touch and force sensor readings can be acquired sequentially using single stimulation signals, i.e., all touch and force sensors are scanned sequentially. Touch and force sensor readings can also be acquired concurrently using multiple stimulation signals, i.e., multiple touch and force sensors are scanned concurrently. In this multiple case, a multi-stimulus matrix for N force sensor channels and M touch sensor channels can include $(N+M)^2$ entries, each row of N+M entries including a unique phase combination for the force and touch sensor stimulation signals. The composite touch and force signals of receive section 907 can be decoded in the touch processor 842 using the inverse of the multi-stimulus matrix.

Figure 10:
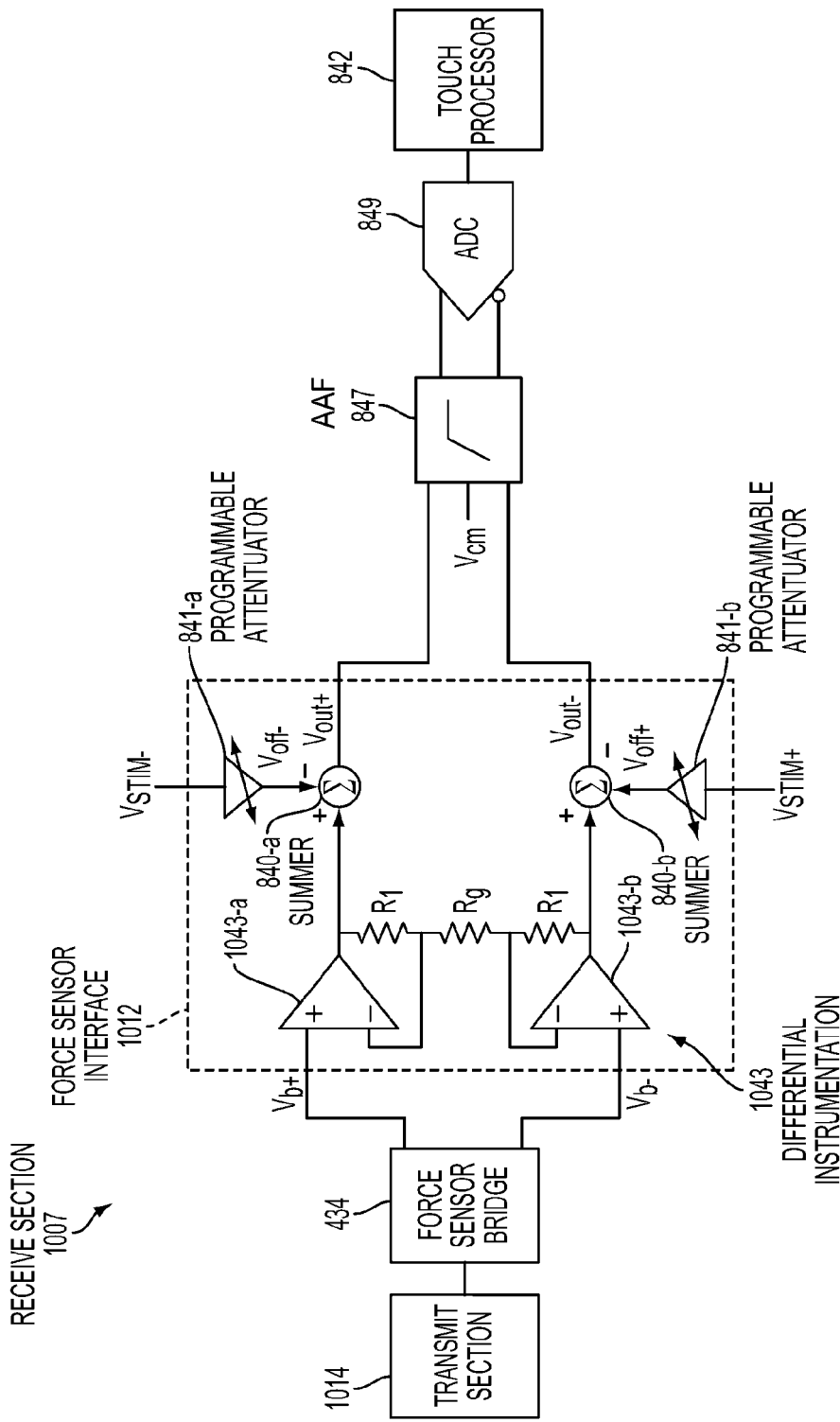
FIG. 10 illustrates still another exemplary receive section of a touch controller having a force sensor interface according to various embodiments.

FIG. 10 illustrates another exemplary receive section of a touch controller having a force sensor interface according to various embodiments. The receive section of FIG. 10 is the same as the receive section of FIG. 8, except that the differential amplifier 843 of FIG. 8 is replaced with differential instrumentation amplifier 1043 in FIG. 10. In the example of FIG. 10, force sensor interface 1012 of touch controller receive section 1007 can include the differential instrumentation amplifier 1043 to gain up the force signals Vb from the force sensor bridge 434 and to reduce noise in the signals. The differential instrumentation amplifier 1043 can include first operational amplifier 1043-*a* to receive the force signal Vb+ from the bridge 434, second operational amplifier 1043-*b* to receive the force signal Vb− from the bridge, and resistors R1, Rg. The operational amplifiers 1043-*a*, 1043-*b* can output the amplified differential force signals to the summers 840 and the programmable attenuators 841 to perform offset subtraction, as described previously in FIG. 8. The differential DC gain of the instrumentation amplifier 1043 can be Gin=(1+2·R1/Rg). In order to maintain the set gain target at the stimulus frequency, the unity gain bandwidth of the instrumentation amplifier 1043 can be above β·Fstm·Gin, where Fstm=the stimulus frequency and β=a derating factor which can be selected based on the maximum tolerable gain error of the instrumentation amplifier at the stimulus frequency. The offset-compensated force signals Vout+, Vout− can be outputted to the differential AAF 847 for further processing as described in FIG. 8. The instrumentation amplifier 1043 can have either a static or a programmable gain according to the needs of touch controller. For example, the operational amplifiers 1043-*a*, 1043-*b* can both have a static gain, both a programmable gain, or combinations of the two.

The receive section 1007 can be coupled to transmit section 1014, which can be the transmit sections of FIGS. 5 through 7, for example, to drive the bridge 434.

Figure 11:
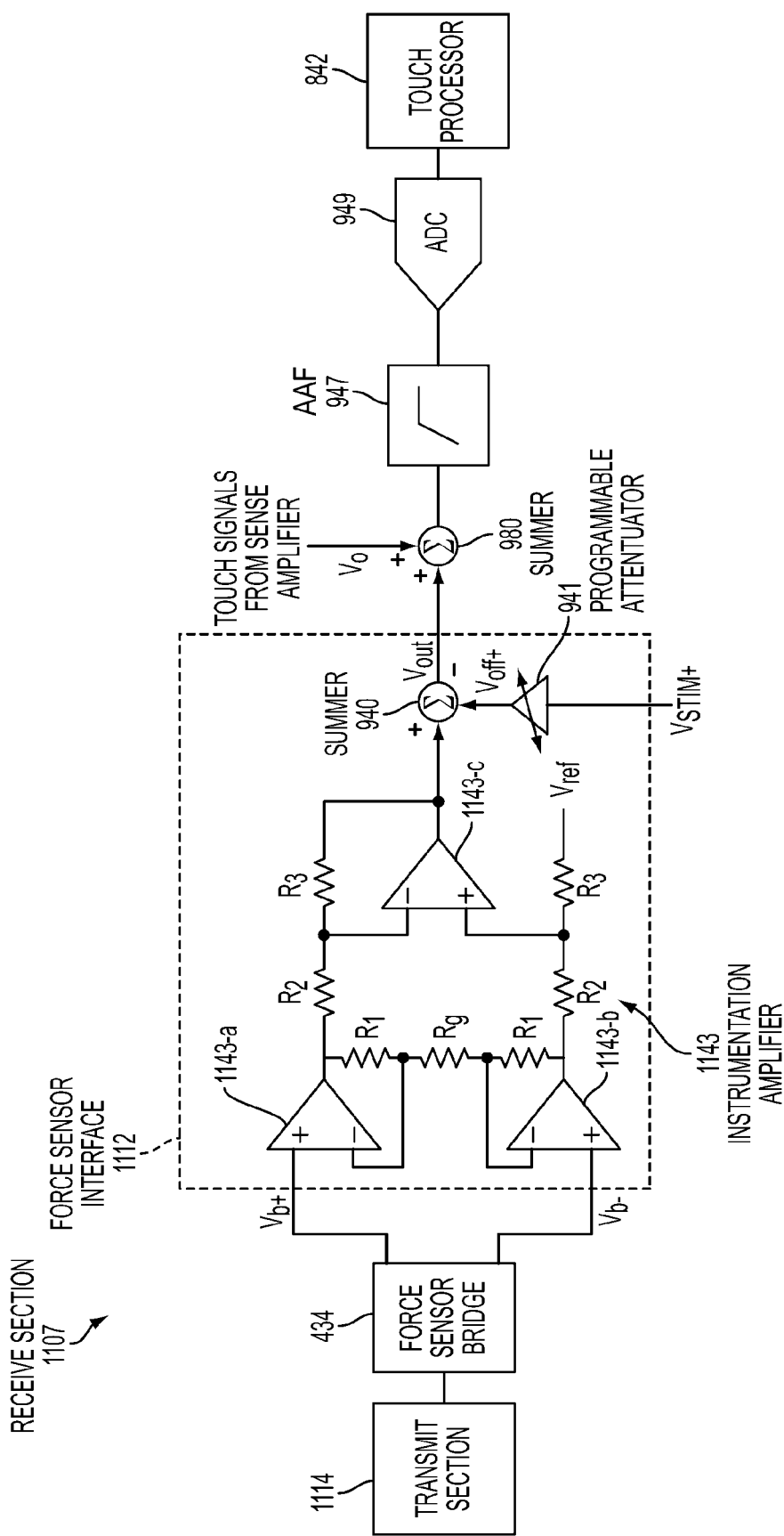
FIG. 11 illustrates yet another exemplary receive section of a touch controller having a force sensor interface according to various embodiments.

FIG. 11 illustrates still another exemplary receive section of a touch controller having a force sensor interface according to various embodiments. The receive section of FIG. 11 is the same as the receive section of FIG. 9, except the differential amplifier 943 and DSC 973 of FIG. 9 are replaced with instrumentation amplifier 1143 in FIG. 11. In the example of FIG. 11, force sensor interface 1112 of touch controller receive section 1107 can include the instrumentation amplifier 1143 to gain up the force signals Vb from the force sensor bridge 434 and to reduce noise in the signals. The instrumentation amplifier 1143 can include first operational amplifier 1143-*a* to receive the force signal Vb+ from the bridge 434, second operational amplifier 1143-*b* to receive the force signal Vb− from the bridge, and resistors R1, R2, R3, Rg. The instrumentation amplifier 1143 can also include third operational amplifier 1143-*c* to receive the amplified differential force signals outputted from the first and second operational amplifiers 1143-*a*, 1143-*b* and output a single ended force signal to the summer 940 and the programmable attenuator 941 to perform offset subtraction, as described previously in FIG. 9. The gain of the instrumentation amplifier 1143 can be Gin=(1+2·R1/Rg)·(R3/R2). The unity gain bandwidth requirements of the instrumentation amplifier 1143 can be selected according to the targets described previously regarding FIG. 10. The offset-compensated force signals Vout and the touch signals can be combined at the summer 980 and outputted to the AAF 947 for further processing as described in FIG. 9. The instrumentation amplifier 1143 can have either a static or a programmable gain according to the needs of the touch controller. For example, the operational amplifiers 1143-*a*, 1143-*b*, 1143-*c* can all have a static gain, all have a programmable gain, or combinations of the two.

In an alternate embodiment, the summer 980 can be omitted and the force signals processed by the AAF 947 and ADC 949, while the touch signals are processed concurrently by a different AAF and ADC.

The receive section 1107 can be coupled to transmit section 1114, which can be the transmit section of FIG. 7, for example, to drive the bridge 434. Touch and force sensor readings can be acquired and processed in similar manners as described previously regarding FIG. 9.

Figure 12:
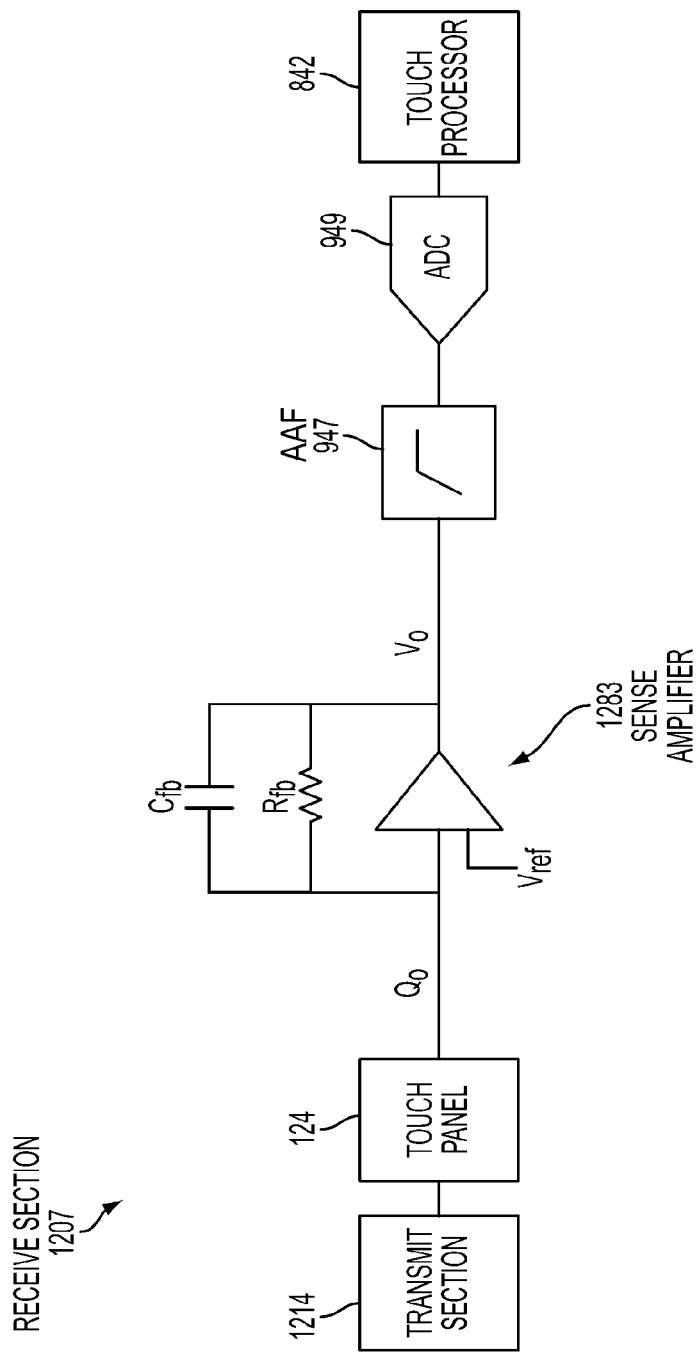
FIG. 12 illustrates an exemplary receive section of a touch controller having touch sensing circuitry according to various embodiments.

In addition to a force sensor interface as illustrated in FIGS. 8 through 11, a touch controller receive section can include touch sensing circuitry for a touch panel. FIG. 12 illustrates an exemplary receive section of a touch controller having touch sensing circuitry according to various embodiments. In the example of FIG. 12, receive section 1207 of a touch controller can include sense amplifier 1283 for receiving and preparing touch signals from the touch panel 124 for processing. The touch panel 124 can have multiple touch sensors. In some embodiments, the touch sensors can be segmented into groups, e.g., columns, and each group coupled to a particular sense amplifier 1283. In some embodiments, different groups, e.g., columns, of touch sensors can share a sense amplifier 1283, where the amplifier can be switched between the groups. The sense amplifier 1283 can connect to the touch panel 124 to receive touch signal charge Qo, indicative of a touch or hover at the panel. The sense amplifier 1283 can convert the touch signal charge Qo through feedback resistor Rfb and feedback capacitor Cfb to a touch signal voltage Vo. The sense amplifier 1283 can output the touch signal voltage Vo to the AAF 947 to attenuate noise in the signals. In some embodiments, the sense amplifier 1283 can have either a static or a programmable gain according to the needs of the touch controller. The ADC 949 can digitize the noise-reduced touch signals and output the signals to the touch processor 842 for further processing. The touch circuitry of FIG. 12 can be operated concurrently with the force and touch circuitry of FIGS. 8 through 11.

In alternate embodiments, the touch panel 124 of FIG. 12 can share the AAF 947 and the ADC 949 with the force sensor bridge 434, as described previously in FIGS. 9 and 11, where the summer 980 could be disposed between the sense amplifier 1283 and the AAF 947 to receive the touch signals Vo and the force signals Vout.

The receive section 1207 can be coupled to transmit section 1214, which can be the transmit sections of FIGS. 5 through 7, for example, to drive the touch panel 124.

It is to be understood that the circuits of FIGS. 5 through 12 are not limited to the components described therein, but can include other and/or additional components capable of performing force and touch signal processing according to various embodiments.

Figure 13:
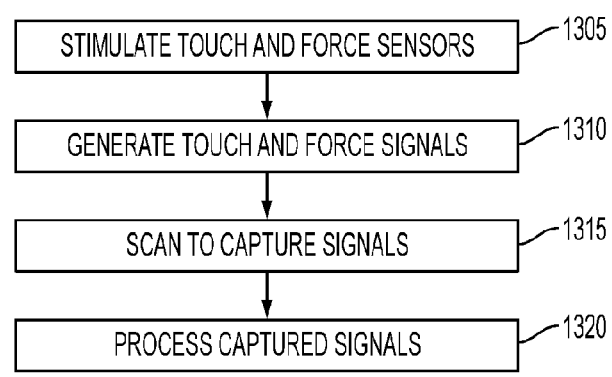
FIG. 13 illustrates a method for sensing force and touch at a touch controller having a force sensor interface according to various embodiments.

FIG. 13 illustrates an exemplary method for sensing force and touch at a touch controller having a force sensor interface according to various embodiments. In the example of FIG. 13, a touch controller's transmit section can apply stimulation signals Vstim to a touch panel and a force sensor bridge to drive them to sense a touch or hover at the panel and a force applied at the bridge, respectively (1305). The stimulation signals Vstim can be applied to the bridge via a force sensor interface, as described previously. The touch controller's scan logic can control the timing of the stimulation signals Vstim to the panel and bridge. In response to the stimulation signals Vstim, the panel can generate touch signals, indicative of a touch or hover at the panel, and the bridge can generate force signals, indicative of a force applied at the bridge (1310).

The touch controller can then perform a scan of the panel and the bridge outputs to capture the touch signals and the force signals (1315). The scan logic can control the scanning of the panel and bridge in order to transmit the touch and force signals to the touch controller's receive section for processing. In some embodiments, during a scan period, the touch controller can perform the panel scan and the bridge scan sequentially. For example, the panel scan can be performed, followed by the bridge scan, or vice versa. In some embodiments, during the scan period, the touch controller can perform the panel scan and the bridge scan concurrently. In some embodiments, during the scan period, the touch controller can perform a hybrid sequential-concurrent scan, in which some portions of the panel and bridge scans can be performed together, while other portions of the scans can be performed in sequence. For example, at the beginning of the scan period, both the panel and bridge scans can be started. After a brief period, the bridge scan can be suspended while the panel scan completes. The bridge scan can then resume and complete. The hybrid scan can be useful in cases where force is applied intermittently, such that an initial bridge scan concurrently with the panel scan can indicate quickly whether an applied force is present, necessitating a full bridge scan.

In some embodiments, both scans need not be performed every scan period. For example, the bridge scan can be performed every other scan period or at some other predetermined frequency. In some embodiments, the scans can be triggered, rather than automatically performed. For example, during the scan period, the panel scan can trigger the bridge scan after the panel scan completes. Conversely, the bridge scan can trigger the panel scan upon completion. Alternatively, the panel scan can trigger the bridge scan if the panel scan indicates that the proximity of a touching or hovering object is likely to result in the object applying a force to the bridge. Alternatively, some device condition, e.g., power status, can trigger either or both scans.

The touch controller's receive section can then process the touch and force signals (1320). The processed touch and force signals can cause some action to be performed by a device having the panel, bridge, and touch controller.

Figure 14:
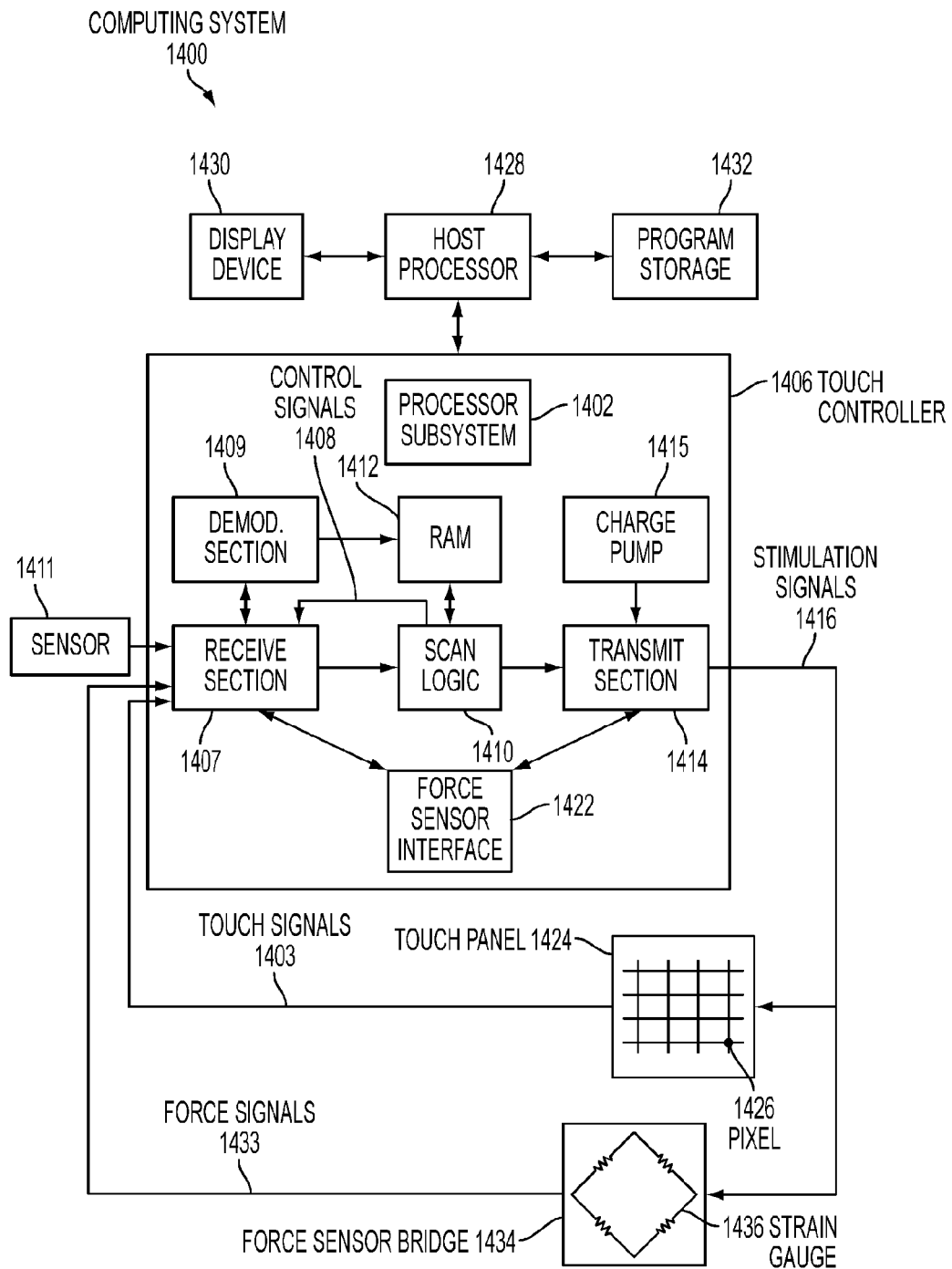
FIG. 14 illustrates an exemplary computing system for sensing force and touch according to various embodiments.

FIG. 14 illustrates an exemplary computing system 1400 that can have a touch controller with a force sensor interface according to various embodiments described herein. In the example of FIG. 14, computing system 1400 can include touch controller 1406. The touch controller 1406 can be a single application specific integrated circuit (ASIC) that can include one or more processor subsystems 1402, which can include one or more main processors, such as ARM968 processors or other processors with similar functionality and capabilities. However, in other embodiments, the processor functionality can be implemented instead by dedicated logic, such as a state machine. The processor subsystems 1402 can also include peripherals (not shown) such as random access memory (RAM) or other types of memory or storage, watchdog timers and the like.

The touch controller 1406 can also include receive section 1407 for receiving signals, such as touch signals 1403 of one or more touch sense channels (not shown), force signals 1433 of a force sense channel (not shown), other signals from other sensors such as sensor 1411, etc. The touch controller 1406 can also include demodulation section 1409 such as a multi-stage vector demodulation engine, panel scan logic 1410, and transmit section 1414 for transmitting stimulation signals 1416 to touch sensor panel 1424 to drive the panel and to force sensor bridge 1434 to drive the bridge. The panel scan logic 1410 can access RAM 1412, autonomously read data from the sense channels, and provide control for the sense channels. In addition, the panel scan logic 1410 can control the transmit section 1414 to generate the stimulation signals 1416 at various frequencies and phases that can be selectively applied to rows of the touch sensor panel 1424 and to the force sensor bridge 1434.

The touch controller 1406 can include force sensor interface 1422, which can couple to touch circuitry in the transmit section 1414 and the receive section 1407, to integrate the force sensor bridge 1434 with the touch system. As a result, the touch sensor panel 1424 and the force sensor bridge 1434 can operate concurrently to sense a touch or hover at the panel and a force applied at the bridge.

The touch controller 1406 can also include charge pump 1415, which can be used to generate the supply voltage for the transmit section 1414. The stimulation signals 1416 can have amplitudes higher than the maximum voltage by cascading two charge store devices, e.g., capacitors, together to form the charge pump 1415. Therefore, the stimulus voltage can be higher (e.g., 6V) than the voltage level a single capacitor can handle (e.g., 3.6V). Although FIG. 14 shows the charge pump 1415 separate from the transmit section 1414, the charge pump can be part of the transmit section.

Computing system 1400 can also include touch sensor panel 1424, which can be as described above in FIGS. 3A and 3B, and force sensor bridge 1434, which can be as described above in FIGS. 4A and 4B, for example.

Computing system 1400 can include host processor 1428 for receiving outputs from the processor subsystems 1402 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 1428 can also perform additional functions that may not be related to panel processing, and can be coupled to program storage 1432 and display device 1430 such as an LCD display for providing a UI to a user of the device. In some embodiments, the host processor 1428 can be a separate component from the touch controller 1406, as shown. In other embodiments, the host processor 1428 can be included as part of the touch controller 1406. In still other embodiments, the functions of the host processor 1428 can be performed by the processor subsystem 1402 and/or distributed among other components of the touch controller 1406. The display device 1430 together with the touch sensor panel 1424, when located partially or entirely under the touch sensor panel or when integrated with the touch sensor panel, can form a touch sensitive device such as a touch screen.

Note that one or more of the functions described above, can be performed, for example, by firmware stored in memory (e.g., one of the peripherals) and executed by the processor subsystem 1402, or stored in the program storage 1432 and executed by the host processor 1428. The firmware can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any non-transitory medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the touch sensor panel is not limited to touch, as described in FIG. 14, but can be a proximity panel or any other panel according to various embodiments. In addition, the touch sensor panel described herein can be a multi-touch sensor panel.

It is further to be understood that the computing system is not limited to the components and configuration of FIG. 14, but can include other and/or additional components in various configurations capable of sensing touch and force according to various embodiments.

Figure 15:
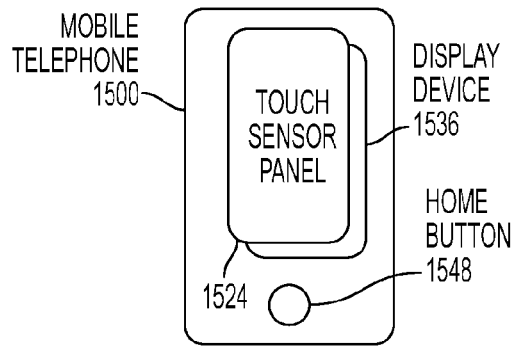
FIG. 15 illustrates an exemplary mobile telephone having force and touch sensing capabilities according to various embodiments.

FIG. 15 illustrates an exemplary mobile telephone 1500 that can include a touch controller having a force sensor interface, the touch controller capable of operating on home button 1548 to sense an applied force, touch panel 1524 to sense a touch or hover, display device 1536, and other computing system blocks according to various embodiments.

Figure 16:
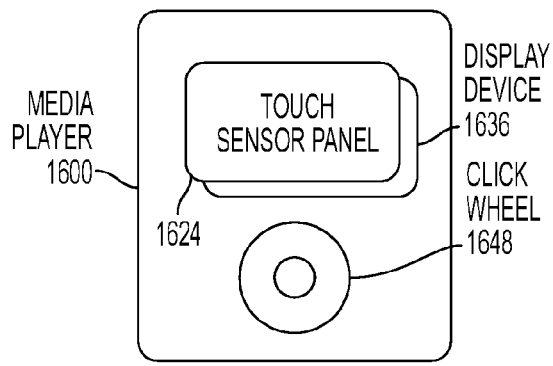
FIG. 16 illustrates an exemplary digital media player having force and touch sensing capabilities according to various embodiments.

FIG. 16 illustrates an exemplary digital media player 1600 that can include a touch controller having a force sensor interface, the touch controller capable of operating on clickwheel 1648 to sense an applied force, touch panel 1624 to sense a touch or hover, display device 1636, and other computing system blocks according to various embodiments.

Figure 17:
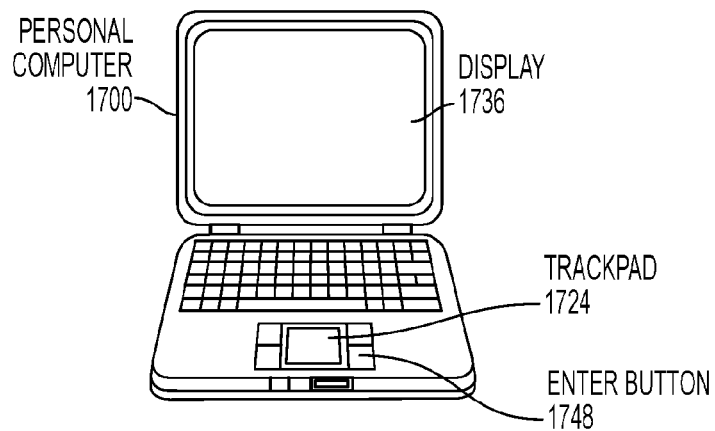
FIG. 17 illustrates an exemplary personal computer having force and touch sensing capabilities according to various embodiments.

FIG. 17 illustrates an exemplary personal computer 1700 that can include a touch controller having a force sensor interface, the touch controller capable of operating on enter buttons 1748 to sense an applied force, touch pad 1724 to sense a touch or hover, display 1736, and other computing system blocks according to various embodiments.

The mobile telephone, media player, and personal computer of FIGS. 15 through 17 can provide efficient power consumption, compact device size, and improved force sensing by tightly integrating force sensing circuitry with existing touch sensing circuitry according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. An interface for a touch controller comprising:
a first portion disposed between a first touch component of the touch controller and a force sensor to drive the force sensor with a differential input formed from a stimulation signal and an inverted stimulation signal to sense an applied force; and
a second portion disposed between a second touch component of the touch controller and the force sensor to process a force signal from the force sensor indicative of the applied force.

2. The interface of claim 1, wherein the first portion comprises:
a connector configured to connect the first touch component to the force sensor and to send a stimulation signal from the first touch component to the force sensor to drive the force sensor, wherein the first touch component comprises a touch buffer.

3. The interface of claim 1, wherein the first portion comprises:
a connector configured to connect the first touch component to the force sensor and to send the stimulation signal from the first touch component to the force sensor;
an inverter coupled to the first touch component and configured to receive the stimulation signal from the first touch component and to invert the stimulation signal; and
a force buffer coupled to the inverter and configured to send the inverted stimulation signal to the force sensor, wherein the first touch component comprises a touch buffer.

4. The interface of claim 1, wherein the first portion comprises:
a multiplexer coupled to the first touch component and configured to select the stimulation signal from the first touch component for sending to the force sensor;
a first force buffer coupled to the multiplexer and configured to send the stimulation signal to the force sensor;
an inverter coupled to the multiplexer and configured to receive the stimulation signal from the multiplexer and to invert the stimulation signal; and
a second force buffer coupled to the inverter and configured to send the inverted stimulation signal to the force sensor, wherein the first touch component comprises a stimulation signal generator.

5. An interface for a touch controller comprising:
a first portion disposed between a first touch component of the touch controller and a force sensor to drive the force sensor to sense an applied force; and
a second portion disposed between a second touch component of the touch controller and the force sensor to process a force signal from the force sensor indicative of the applied force, wherein the second portion comprises:
an amplifier coupled to the force sensor and configured to amplify the force signal; and
a mismatch circuit coupled to an output of the amplifier and the second touch component and configured to compensate for errors in an output signal value of the output, wherein the second touch component comprises a filter.

6. The interface of claim 5, wherein the amplifier is a differential amplifier, the differential amplifier outputting a first signal associated with the force signal to the mismatch circuit and a second signal associated with the force signal to the mismatch circuit, and wherein the mismatch circuit compensates for errors in the first and second signals.

7. The interface of claim 6, wherein the second portion comprises:
a converter coupled to the differential amplifier and the mismatch circuit and configured to convert the output of the differential amplifier and to send the converted output to the mismatch circuit to compensate for errors in the converted output.

8. The interface of claim 5, wherein the amplifier is a differential instrumentation amplifier, the differential instrumentation amplifier comprising a first amplifier to output a first signal associated with the force signal to the mismatch circuit and a second amplifier to output a second signal associated with the force signal to the mismatch circuit, and wherein the mismatch circuit compensates for errors in the first and second signals.

9. The interface of claim 5, wherein the amplifier is an instrumentation amplifier, the instrumentation amplifier comprising a first amplifier to output a first signal associated with the force signal, a second amplifier to output a second signal associated with the force signal, and a third amplifier to receive the first and second signals and to output a third signal based on the first and second signals to the mismatch circuit, and wherein the mismatch circuit compensates for errors in the third signal.

10. A touch controller comprising:
a transmit section configured to drive a touch sensor with a stimulation signal;
a receive section configured to process touch signals from the touch sensor in response to the stimulation signal; and
an interface integrated within the transmit section and the receive section to couple a force sensor thereto and configured to send the stimulation signal to the force sensor to drive the force sensor and to receive force signals from the force sensor in response to the stimulation signal, wherein the transmit section drives the touch sensor and the force sensor concurrently and the receive section processes the touch signals and the force signals concurrently, wherein the force sensor comprises a strain gauge, and wherein the force signals indicate a change in resistance of the strain gauge.

11. The controller of claim 10, wherein the transmit section comprises touch transmit circuitry configured to transmit the stimulation signal to the touch sensor, and wherein the receive section comprises touch receive circuitry configured to receive the touch signals from the touch sensor.

12. The controller of claim 10, wherein transmit section comprises touch transmit circuitry configured to transmit the stimulation signal to the force sensor via the interface, and wherein the receive section comprises touch receive circuitry configured to receive the force signals from the force sensor via the interface.

13. The controller of claim 12, wherein the touch receive circuitry comprises at least one of a bandpass filter or a low pass filter configured to reduce noise in the force signals.

14. The controller of claim 10, wherein the stimulation signal is configured to modulate so as to shift the force signals from the force sensor to a low noise frequency.

15. An integrated touch and force sensing device comprising:
at least one touch sensor that produces touch signals;
at least one force sensor that produces force signals, wherein the force sensor comprises a force sensor bridge configured to generate the force signals based on a resistance change at the bridge; and
a touch controller configured to integrally couple the touch sensor and the force sensor in the device, wherein the touch controller comprises:
touch circuitry that produces a stimulation signal; and
a signal path that conveys the stimulation signal to the touch sensor and the force sensor to produce the touch and force signals.

16. The device of claim 15, wherein the touch sensor comprises a touch panel configured to generate the touch signals based on a capacitance change at the panel.

17. The device of claim 15, wherein the bridge comprises four resistors, at least one of the resistors comprising a strain gauge.

18. The device of claim 17, wherein at least two of the resistors are part of the touch circuitry.

19. The device of claim 15, wherein the touch controller is configured to drive the force sensor with at least one of a single-ended stimulation signal or a differential stimulation signal.

20. The device of claim 15 incorporated into at least one of a mobile telephone, a digital media player, or a portable computer.

21. A method for sensing a touch and a force at a touch sensitive device comprising:
concurrently stimulating a touch sensor and a force sensor using touch circuitry;
generating a touch signal by the touch sensor, indicative of a touch at the touch sensor, and a force signal by the force sensor, indicative of a force applied at the force sensor, wherein the force signal indicates a resistance change in the force sensor due to the force applied at the force sensor;
scanning the touch sensor and the force sensor to capture the touch signal and the force signal respectively;
summing the touch signal and the force signal; and
processing the summed signal using the touch circuitry.

22. The method of claim 21, wherein scanning comprises:
concurrently scanning the touch sensor and the force sensor.

23. The method of claim 21, wherein scanning comprises:
scanning the touch sensor and the force sensor sequentially.

24. The method of claim 21, comprising:
triggering the scanning of at least one of the touch sensor or the force sensor based on a device condition.

* * * * *

UNITED STATES PATENT AND TRADEMARK OFFICE
CERTIFICATE OF CORRECTION

| | | |
|---|---|---|
| PATENT NO. | : 8,988,384 B2 | |
| APPLICATION NO. | : 13/243925 | |
| DATED | : March 24, 2015 | |
| INVENTOR(S) | : Christoph Horst Krah et al. | |

It is certified that error appears in the above-identified patent and that said Letters Patent is hereby corrected as shown below:

Claims

In claim 12, column 17, line 48, delete "wherein transmit section" and insert --wherein the transmit section--.

Signed and Sealed this
Twenty-eighth Day of July, 2015

Michelle K. Lee
*Director of the United States Patent and Trademark Office*